United States Patent
Chen et al.

(10) Patent No.: US 9,686,811 B2
(45) Date of Patent: Jun. 20, 2017

(54) METHOD AND APPARATUS FOR WIRELESS PEER-TO-PEER COMMUNICATION WITH MULTIPLE RADIO INTERFACES

(75) Inventors: Canfeng Chen, Beijing (CN); Jia Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 64 days.

(21) Appl. No.: 14/352,688

(22) PCT Filed: Oct. 27, 2011

(86) PCT No.: PCT/CN2011/081448
§ 371 (c)(1),
(2), (4) Date: Jun. 30, 2014

(87) PCT Pub. No.: WO2013/060012
PCT Pub. Date: May 2, 2013

(65) Prior Publication Data
US 2014/0328296 A1  Nov. 6, 2014

(51) Int. Cl.
*H04W 4/00* (2009.01)
*H04W 76/02* (2009.01)
(Continued)

(52) U.S. Cl.
CPC ......... *H04W 76/023* (2013.01); *H04L 67/104* (2013.01); *H04W 92/02* (2013.01); *H04W 36/14* (2013.01); *H04W 84/18* (2013.01)

(58) Field of Classification Search
None
See application file for complete search history.

(56) References Cited

U.S. PATENT DOCUMENTS

2004/0260701 A1*  12/2004  Lehikoinen ......... G06F 17/3089
2005/0221813 A1   10/2005  Rajahalme et al.
(Continued)

FOREIGN PATENT DOCUMENTS

WO  2004004373  1/2004
WO  2006031419  3/2006
(Continued)

OTHER PUBLICATIONS

International Search Report received for corresponding Patent Cooperation Treaty Application No. PCT/CN2011/081448, dated Aug. 16, 2012, 4 pages.
(Continued)

*Primary Examiner* — Bob Phunkulh
(74) *Attorney, Agent, or Firm* — Mintz Levin Cohn Ferris Glovsky and Popeo, P.C.

(57) ABSTRACT

Methods, apparatus, computer program products and wireless devices are provided for performing a wireless P2P communication application in a wireless device equipped with two or more radio interfaces. A method comprises establishing a first transport layer connection for transporting meta-information of a P2P communication application via a first radio interface; and establishing a second transport layer connection with at least one peer node for transporting data chunks of the P2P communication application by using a network address of a second radio interface, so that the data chunks can be transported via the second radio interface.

19 Claims, 6 Drawing Sheets

(51) Int. Cl.
*H04L 29/08* (2006.01)
*H04W 92/02* (2009.01)
*H04W 36/14* (2009.01)
*H04W 84/18* (2009.01)

(56) References Cited

U.S. PATENT DOCUMENTS

| | | | | |
|---|---|---|---|---|
| 2010/0128695 A1* | 5/2010 | Nagaraja | ............. | H04W 76/023 370/331 |
| 2011/0255454 A1* | 10/2011 | Hauser | ................. | H04W 88/04 370/311 |
| 2011/0294474 A1* | 12/2011 | Barany | ................ | H04W 8/005 455/414.1 |
| 2012/0207032 A1* | 8/2012 | Chen | ........................ | H04L 1/24 370/252 |

FOREIGN PATENT DOCUMENTS

| | | |
|---|---|---|
| WO | 2007/045717 A2 | 4/2007 |
| WO | 2010059824 | 5/2010 |
| WO | 2010/109054 A1 | 9/2010 |

OTHER PUBLICATIONS

"Version 3.0 + HS of the Bluetooth Core Specification", Bluetooth Specification, Apr. 21, 2009, pp. 1-1712.

Jung et al., "BlueTorrent: Cooperative Content Sharing for Bluetooth Users", Fifth Annual IEEE International Conference on Pervasive Computing and Communications, Mar. 19-23, 2007, 10 pages.

Zhao et al., "A Multi-Radio Wireless P2P Network Testbed", Proceedings of the 4th ACM international workshop on Experimental evaluation and characterization, Sep. 21, 2009, pp. 93-94.

Jin et al., "WiZi-Cloud: Application-Transparent Dual ZigBee-WiFi Radios for Low Power Internet Access", Proceedings in IEEE Infocom, Apr. 10-15, 2011, pp. 1-9.

Extended European Search Report received for corresponding European Patent Application No. 11874615.5, dated Nov. 26, 2015, 5 pages.

* cited by examiner

METHOD AND APPARATUS FOR WIRELESS PEER-TO-PEER COMMUNICATION WITH MULTIPLE RADIO INTERFACES

RELATED APPLICATION

This application was originally filed as PCT Application No. PCT/CN2011/081448 filed Oct. 27, 2011.

FIELD OF THE INVENTION

The field of the invention relates to wireless peer-to-peer (hereinafter, referred to as "P2P") communication, and more particularly to realizing wireless P2P communication in a wireless device equipped with multiple radio interfaces.

BACKGROUND OF THE INVENTION

The P2P communication application is widely applied to the network communication in today's Internet for sharing data, for example involving file sharing, multimedia streaming, and resource dispatching. In contrast to the traditional client-server communication mode, where only servers supply (send) and clients consume (receive), a P2P communication enables each participant (hereinafter referred to as "peer node(s)") of the communication communicate over a distributed network architecture. Peer nodes in a P2P network are equally privileged, so that the communication can be directly made among one or more peer nodes, without any need for central coordination by servers.

In the wireless communication environment, a P2P communication mode can also be used for information collecting and sharing among wireless devices, such as mobile phones, tablet computers, digital media players, or other devices capable of wireless communication. The P2P communication application implemented in the wireless communication environment can be called a wireless P2P communication application. The wireless communication network in a P2P communication mode can be called a wireless P2P communication network. This wireless P2P communication network can be implemented with an infrastructure supports (such as cellular network), or without any infrastructure support (such as ad hoc network). The wireless P2P communication network can provide short range, high data rate communication between wireless devices. After a wireless P2P communication link is setup, signals and data can be transferred between the wireless devices, without traversing through an access node (such as a base station) or centrally managed network.

As the rapid development of wireless communication technology, radio interfaces of more and more wireless communication technologies, e.g. Wi-Fi (IEEE 802.11b and 802.11g), GSM (Global System of Mobile communication), Bluetooth™ (including Bluetooth™ Low Energy (BT LE)), or ZigBee (IEEE 802.15.4, IEEE 802.15.4a), etc., can be equipped in wireless devices. Meanwhile, various techniques have been or are being incorporated into Personal Area Networks (PAN) to support Internet Protocol (IP) over various radio interfaces, such as 6LowPAN (IPv6 over Low power Wireless Personal Area Networks) for ZigBee, BNEP (Bluetooth Network Encapsulation Protocol) for Bluetooth™, and the ongoing IP over BT LE standardization process. These, to a large extend, pave the way for an interoperable design in realizing a wireless P2P communication application with various radio interfaces in wireless devices.

In the wireless P2P communication application, the data access patterns are opportunistic, since data is only exchangeable when there are peer nodes available to be communicated and when some of them having same interests. To meet the demand of a P2P communication application in wireless communication environment, radio interfaces in the wireless device are required being open all the time to execute constantly resource discovery operations for a P2P communication, such as neighbor discovery, data query, index exchange, etc. This resource discovery process is time/energy consuming, causing excessive energy consumption to the wireless devices. Energy consumption is a significant problem for wireless devices. Especially for those wireless devices powered by batteries, the excessive energy consumption in a P2P communication will largely shorten their working cycles.

A number of power-saving techniques have been proposed to reduce power consumption in wireless P2P communication. However, current techniques have not sufficiently addressed the issue of power consumption while provide high efficiency of data delivery. Traditional wireless P2P communication systems partially solve this problem by introducing low-energy radio for wireless P2P communication. For example, "*Bluetorrent: Cooperative content sharing for bluetooth users*" Percom 2007, March 2007, by Sewook Jung, etc. proposed a solution of building a wireless P2P file sharing application totally upon low-power and short-range Bluetooth networks that are always-on. This solution, though mitigates the energy consumption, has an obvious limit in transmission bandwidth of 1 Mbps, which is far below users' expectation in P2P applications.

Another power-saving technique is using multiple radio interfaces in a mobile device to concurrently communicate on different channels for heterogeneous P2P communication. For example, Ze Zhao, etc. mentioned this kind of wireless P2P communication in "*A multi-radio wireless P2P network testbed*" (in Proceedings of the 4th ACM international workshop on Experimental evaluation and characterization (WINTECH '09). ACM, New York, N.Y., USA, Page 93-94). However, this kind of multi-radio wireless P2P communication system now only supports concurrent transmission on multiple radio interfaces, but does not involve specific design for how and when to use these multiple radio interfaces for distributing the traffic of a P2P communication application.

Some wireless communication mechanism for a mobile device equipped with multiple radio interfaces have been proposed, wherein different radio interfaces are adopted for transport traffic according to bit rates of the traffic. For example, Tao Jin, etc. proposed to adopt Wi-Fi interface for high bit rates and adopt Zigbee for lower bit rates in "*WiZi-Cloud: Application-transparent Dual ZigBee-Wi-Fi Radios for Low Power Internet Access*", in IEEE Infocom, Shanghai, China, April, 2011. Bluetooth SIG proposed to adopt UWB interface for high bit rates and adopt Bluetooth interface for lower bit rates in "*Version 3.0+HS of the Bluetooth Core Specification,*" Apr. 21, 2009. This communication mechanism may serves as a low-power transmission method and works well in static scenarios where wireless access is stable for different radio interfaces. However, this communication mechanism may not work well for the wireless P2P communication application. In the wireless P2P communication application, the peer nodes (i.e. wireless devices) moves dynamically, and the communication link in a P2P communication mode through the two radio interfaces will be interrupted constantly. Then, the high-energy radio interface may be inappropriately used for low bit rate traffic, and vice versa, the low-energy radio being inappropriately used for high bit rate traffic. For example, according to the solution of Tao Jin, when the communication link through the Zigbee radio interface is interrupted, the traffic of a P2P communication application will be handover to the Wi-Fi radio interface, causing much high energy consumption; when the communication link through the Wi-Fi radio interface is interrupted, the traffic of a P2P communication application will be handover to the Zigbee radio interface, causing inefficient data transfer. Additionally, in the solution of Tao Jin, WiZi is built in centralized networks where networking infrastructures such as Access Points (APs) are necessary; and it is not applicable in ad-hoc networks where no networking infrastructure exists. However, in the P2P communication, a networking infrastructure is not limited within the scope of centralized networks, but also comprising ad-hoc networks where no networking infrastructure exists. Besides, as frequent resource discovery operation, such as neighbor discovery, data query, index exchange, etc, is a necessity for P2P communication application, using traditional Bluetooth radio interface for continuous peer discovery mode will cause much high energy consumption.

Thus, it would be advancement in the art to provide methods and apparatus that allow for a wireless P2P communication that can overcome the above limitations and disadvantages.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and apparatus for providing a wireless P2P communication application in a wireless device equipped with two or more radio interfaces.

According to one embodiment, a method comprises establishing a first transport layer connection for transporting meta-information of a P2P communication application via a first radio interface; and establishing a second transport layer connection with at least one peer node for transporting data chunks of the P2P communication application by using a network address of a second radio interface, so that the data chunks can be transported via the second radio interface. The meta-information can comprise necessary extra data for transporting the data chunks.

In an exemplary embodiment, the method can further comprise detecting a connection request for transporting data chunks of the P2P communication application; in response to the detection of the connection request, triggering to turn on the second radio interface. A connection request can be detected by detecting the ports of all connection requests of the peer-to-peer communication application. In an exemplary embodiment, the connection request whose port numbers falls within the range from 6881 to 6889 can be detected as the connection request for transporting data chunks.

In an exemplary embodiment, the method can further comprise detecting a disconnection request for finishing the transmission of the data chunks, and in response to the detection of the disconnection request, triggering to turn off the second radio interface. The disconnection request can be detected by detecting the ports of all disconnection requests of the P2P communication application. In an exemplary embodiment, a disconnection request whose port numbers falls within the range from 6881 to 6889 can be detected as the disconnection request for finishing the transmission of the data chunks In an exemplary embodiment, the method can further comprise informing via the first transport layer connection, at least one peer node of the P2P communication application to turn on the radio interface of the at least one peer node for transporting the data chunks. In an exemplary embodiment, the method can further comprise receiving a notification from the at least one peer node, via the first transport layer connection, to turn on the second radio interface for transporting data chunks.

In an exemplary embodiment, establishing of the second connection can comprise sending via the first transport layer connection, a media access address and a network address of the second radio interface to the at least one peer node; and receiving via the first transport layer connection, a media access address and a network address of the radio interface the at least one peer node for transporting data chunks.

In an exemplary embodiment, the first radio interface is able to consume low energy than the second radio interface. For example, the first radio interface can be BT LE radio interface or Zigbee radio interface, and/or the second radio interface can be Wi-Fi radio interface or UWB radio interface.

According to another embodiment, an apparatus comprises at least one processor, and at least one memory including computer program code for one or more computer programs, the at least one memory and the computer program code configured to, with the at least one processor, cause, at least in part, the apparatus to establish a first transport layer connection for transporting meta-information of a P2P communication application via a first radio interface. The apparatus is further caused to establish a second transport layer connection with at least one peer node for transporting data chunks of the P2P communication application by using a network address of a second radio interface, so that the data chunks can be transported via the second radio interface.

According to another embodiment, an apparatus comprises means for establishing a first transport layer connection for transporting meta-information of a P2P communication application via a first radio interface; and means for establishing a second transport layer connection with at least one peer node for transporting data chunks of the P2P communication application by using a network address of a second radio interface, so that the data chunks can be transported via the second radio interface.

According to another embodiment, a computer program product including one or more sequences of one or more instructions which, when executed by one or more processors, cause an apparatus to establish a first transport layer connection for transporting meta-information of a P2P communication application via a first radio interface; and establish a second transport layer connection with at least one peer node for transporting data chunks of the P2P communication application by using a network address of a second radio interface, so that the data chunks can be transported via the second radio interface.

According to another embodiment, a wireless device, comprising a first radio interface; a second radio interface; and a controller coupled to the first radio interface and the second radio interface. The controller can be configured to establish a first transport layer connection for transporting meta-information of a P2P communication application via a first radio interface; and establish a second transport layer connection with at least one peer node for transporting data chunks of the P2P communication application by using a network address of a second radio interface, so that the data chunks can be transported via the second radio interface.

Generally, all terms used in the claims are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those of skill in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE INVENTION

In the following description of the various illustrative embodiments, reference is made to the accompanying drawings, which form a part hereof, and in which are shown by way of illustration various example embodiments in which the invention may be practiced. It is to be understood that other embodiments may be utilized and structural and functional modifications may be made without departing from the scope of the present invention.

Figure 1:
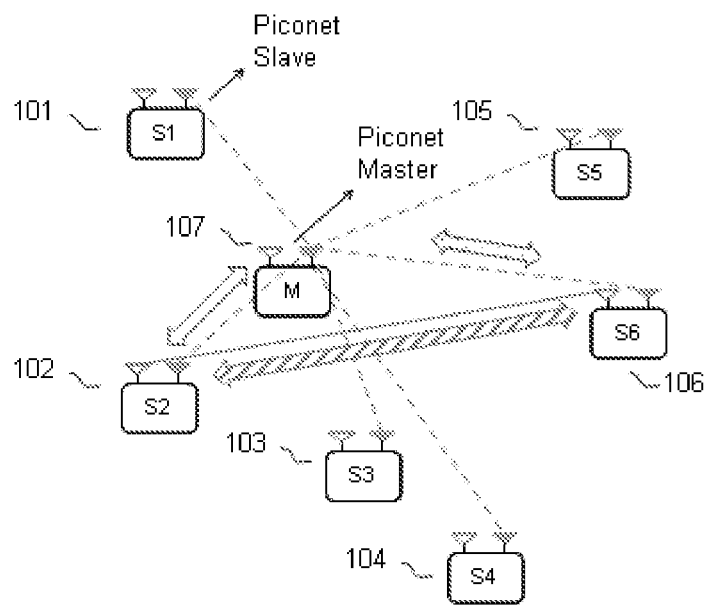
FIG. 1 shows an exemplary structure of a wireless communication network which can support a wireless P2P communication application according to exemplary embodiments of the present invention.
Figure 1:
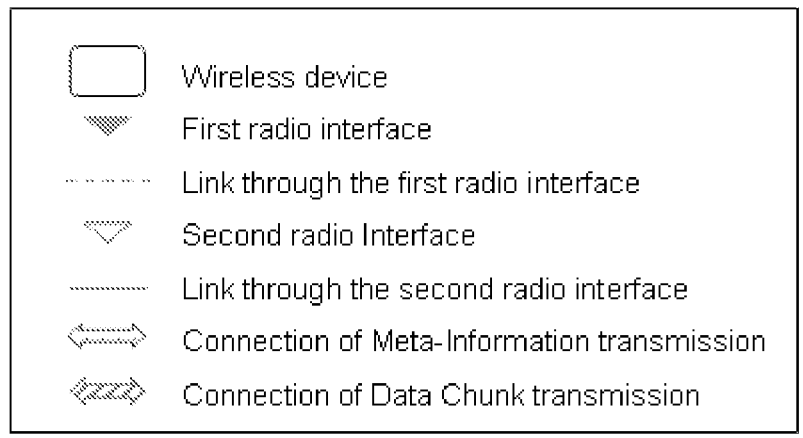

FIG. 1 shows an exemplary structure of a wireless communication network 100 which can support a wireless P2P communication application according to exemplary embodiments of the present invention.

Referring to FIG. 1, a wireless network 100 may comprise two or more wireless devices 101, 102, . . . , 107. These wireless devices communicate among each other in a P2P communication mode. According to one example, the wireless P2P communication network can be constructed in centralized server-based service model, such as a piconet constructed according to the technology of Bluetooth™. For example, one peer node (such as the wireless device 107) of the P2P communication network can serve as a master, to interconnect with the other peer nodes serving as slave (such as the wireless device 101, . . . , 106). The master can be responsible for maintaining management information of the wireless P2P communications of the entire network, and returning responses to the queries from slave.

According to another example, the wireless P2P communication network can be constructed without central infrastructure. In such P2P communication networks, all peer nodes act as equals, merging the roles of clients and server. There is no master node managing the network. Then, various information of the wireless P2P communication can be exchanged directly between peer nodes.

Although just seven peer nodes are depicted, it is to be appreciated that wireless P2P communication network 100 can comprise any number of wireless devices according to the provisions of the specific network technologies. The wireless devices 101, 102, . . . , 107 can also be referred to herein as peer nodes in P2P communication, and may include, but are not limited to, any device with wireless communications capabilities, such as mobile phones, smart phones, laptops, handheld communication devices, handheld computing devices, satellite radios, global positioning systems, PDAs, and/or any other suitable devices for communicating over a wireless P2P communication network.

Each wireless device, 101, . . . , 107, may comprise two radio interfaces, a first radio interface and a second radio interface. As is well known to those skilled in the art, the radio interface can comprises an antenna and supporting hardware and/or software for enabling communications with a wireless P2P communication network. In the wireless network 100, wireless devices can communicate among each other through each of the two radio interfaces, for example as illustrated by the dashed lines and solid lines in FIG. 1.

Figure 2:
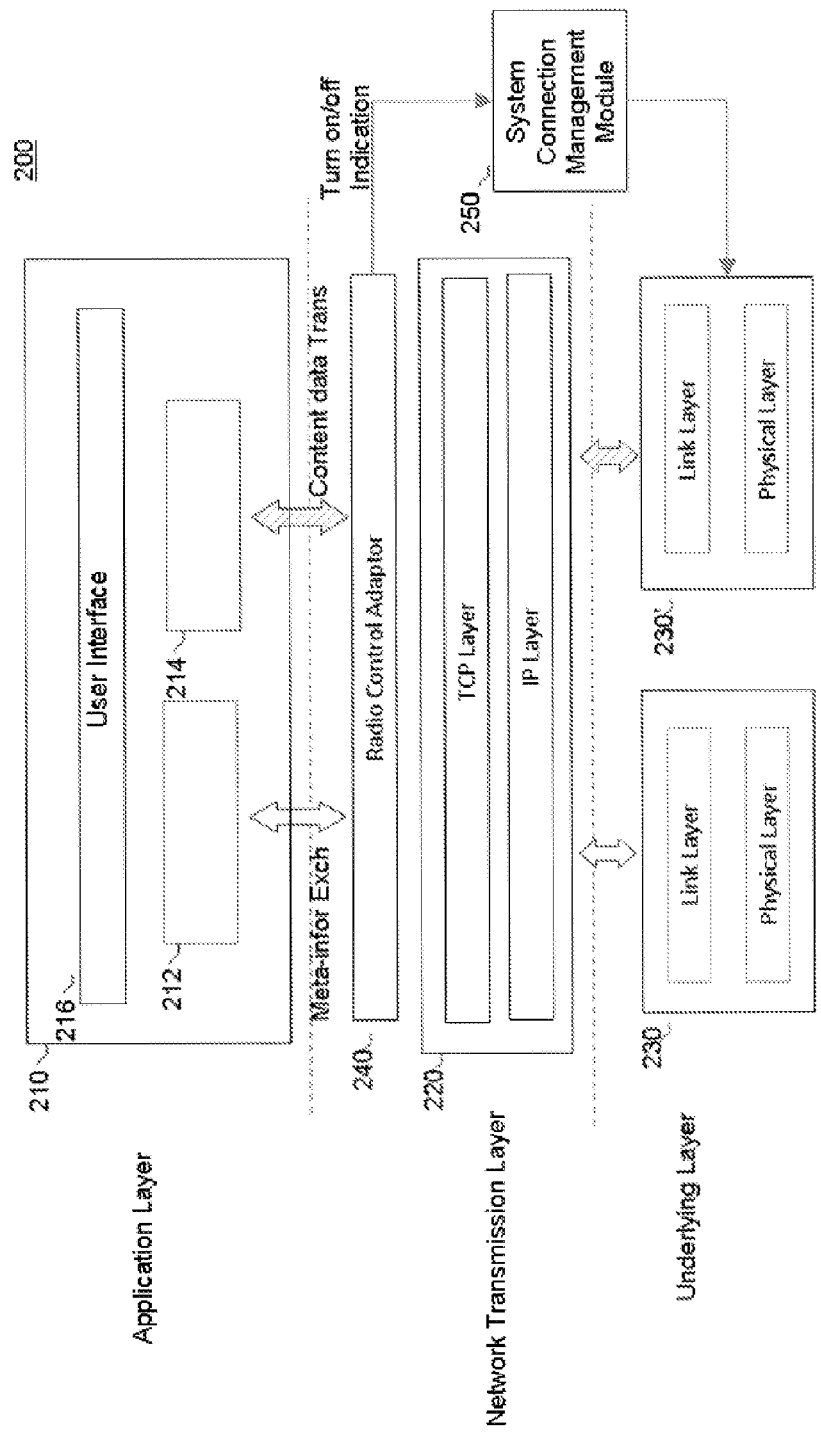
FIG. 2 illustrates a block diagram showing a functional structure of a wireless P2P communication system in a wireless device according to the exemplary embodiments of the present invention.

FIG. 2 illustrates a block diagram showing the functional structure of a wireless P2P communication system in a wireless device according to the exemplary embodiments of the present invention.

The wireless P2P communication system for providing a wireless P2P communication in a wireless device can be described according to the OSI (Open System Interconnect) reference module. Referring to FIG. 2, the wireless P2P communication system can comprise a P2P application module 210 in an application layer, a P2P communication module 220 in a network transmission layer (which can comprising a transport layer (such as a TCP layer) and a network layer (such as a IP layer)), and multiple radio interface modules 230, 230', in an underlying layer which can comprise a media access control (MAC) layer and a physical layer.

The P2P application module 220 can provide a P2P communication application in the application layer of the OSI module. Data of a P2P communication application that needed to be transmitted and/or received over a P2P communication network can be divided as two types. One type of data is the target data that a user of a P2P communication application wants to obtain, for example, in a form of file, multimedia streaming or others. Generally, the size of the target data is large and will be divided into several pieces. Then, as used herein, each pieces of the target data can be referred to as "data chunk(s)". Except the target data, another type of data in P2P communication can be referred to as meta-information of the P2P communication application. Meta-information is necessary extra data which should be exchanged among the peer nodes for obtaining the target data of a P2P communication application. For example, the meta-information can comprises information for a resource discovery operation of a P2P communication application, which can comprises neighbor discovery, data query, index exchange, etc. For a wireless P2P communication application, compared to the transmission of the data chunk, meta-information is transported constantly among peer nodes.

In a P2P communication application, the meta-information and data chunks are generally transported through different connections in the transport layer. For example, a connection for exchanging meta-information and a connection for transporting data chunks can use different groups of ports in the transport layer. This provides a possibility to adopt different radio interfaces for transporting the meta-information and the data chunk through different connections in the transport layer.

In an example embodiment, the P2P application module 210 can comprise a module 212 for processing and storing meta-information. For example, the processing of meta-information can comprise neighbor discovery, resource query, index exchange and the like. The P2P application module 210 can further comprise a module 214 for processing and storing data chunk (such as an index of a data chunk). For example, the processing of data chunk can comprise collecting data chunks, and distributing data chunks.

In an example embodiment, the wireless P2P communication system can comprises two radio interface modules (230 and 230') for providing radio interfaces according to different wireless communication technologies. The wireless communication technologies, can comprise Wi-Fi (IEEE 802.11b and 802.11g), GSM (Global System of Mobile communication), Bluetooth™ (including Bluetooth™ Low Energy (BT LE)), or ZigBee (IEEE 802.15.4, IEEE 802.15.4a), etc.

In an example embodiment, the wireless P2P communication system can further comprise a radio control adaptor 240 for controlling a P2P communication, so that the two radio interfaces can be adopted to transfer meta-information and data chunks respectively. For example, the radio interface which can consume low energy in the wireless P2P communication in comparison with the other radio interface can be adopted for transporting the meta-information, while the other radio interface can be adopted for transporting the data chunk. For the sake of concision, the radio interface that can consume lower energy is referred to as a LR interface, and the other radio interface that can consume higher energy and accordingly provide higher transfer rate of data, can be referred to as a HR interface.

The radio control adaptor 240 can operate between the application layer and the transport layer, so as to establish a transport layer connection for transporting meta-information of a P2P communication application via a LR interface, and establish another transport layer connection for transporting data chunks of the P2P communication application by using the IP address of the HR interface. The radio control adaptor 240 can detect a connection request for transporting data chunks from the P2P application module 210. In response to the detection, the radio control adaptor 240 can trigger to turn on the HR interface, so that a connection for the data chunk transmission via the HR interface can be established. Then, the data chunks can be transported through the HR interface, while the meta-information can be transported through the LR interface in a conventional way. As a result, the two radio interface can be combined in a P2P communication application, without any need to modify the P2P communication application in the application layer.

In an example embodiment, the radio control adaptor 240 can further detect a disconnection request for finishing the transmission of data chunks from the upper P2P application layer, and in response trigger to turn off the HR interface for power saving.

It is to be noted that, when the radio control adaptor 240 trigger to turn on/off the HR interface, the action of turning on/off the HR interface can executed accordingly. For example, if when the radio control adaptor 240 trigger to turn on the HR interface, the HR interface has been turned on already, (due to other connections of data chunk transmission established previously, or other reasons, for example), then the indication of turning on the HR interface can be ignored and the action of turning on the HR interface cannot be executed. In another example, if when the radio control adaptor 240 trigger to turn off the HR interface, there are some reasons that the HR interface should be needed to be kept on, (for example, another connection of data chunk transmission or other kinds of communication connections need to use the HR interface), then the HR interface cannot be turned off. In an example embodiment, the radio control adaptor 240 can trigger to turn on/off the HR interface through a system connection management module 250. The system connection management module 250 can receives a triggering on/off indication from the radio control adapter 240, which indicates the HR interface is needed to be turn on/off, determine whether or not the HR interface should be turned on/off, and turn on/off the HR interface according to the determination. As used herein, the term "turn on" can refer to an operation of making the radio interface become active for a wireless communication from a state being inactive for the wireless communication, and the term "turn off" can refer to an operation of making the radio interface become inactive for a wireless communication from a state being active for the wireless communication.

In an example embodiment, the radio control adaptor 240 can be further configured to communicate with the radio control adaptor of at least one peer wireless device communicating with the wireless device in the P2P communication application. In this regard, the radio control adaptor 240 can send a message to the at least one peer wireless device to trigger on the corresponding HR interface in the at least one peer wireless device, and acquire a media access address and a network address of the corresponding HR interface of the at least one peer wireless device needed for establishing a transport layer connection of data chunk transmission.

In an example embodiment, when no connection request for transporting data chunks is detected, the radio control adaptor 240 can do nothing for the connection establishment of the P2P communication application. That means the connection for transporting the meta-information can be established in a normal way through the LR interface.

In another example embodiment, the transfer rate of the two radio interfaces can be taken into consideration in determining that which radio interface can be adopted for transporting the meta-information as the LR interface disused above, and/or which radio interface can be adopted for transporting the data chunks as the HR interface disused above. For example, the radio interface which can provide low transfer rate of data in comparison to the other radio interface can be adopted for transporting the meta-information, while the other radio interface can be adopted for transporting the data chunks. In another example embodiment, the security and/or stability can be taken into consideration in the determining can be adopted for transporting the meta-information as the LR interface disused above and/or which radio interface can be adopted for transporting the data chunks as the HR interface disused above.

As will be appreciated by one of skill in the art, the functionality of the modules may be combined or distributed as desired in various embodiments. In addition, each function module, and combinations of the function modules in the wireless device, may be implemented by various means implementing the function specified for the module or combinations of the modules, such as hardware, firmware, controller, processor, circuitry and/or other devices associated with execution of software including one or more computer program instructions. For example, one or more of the procedures described above may be embodied by computer program instructions. In this regard, the computer program instructions which embody the procedures described above may be stored by a memory device of the mobile terminal and executed by a processor in the mobile terminal. For example, the LR interface module and the HR interface module may include, for example, an antenna (or antennas) and supporting hardware and/or software for enabling communications with a wireless communication network.

Figure 3:
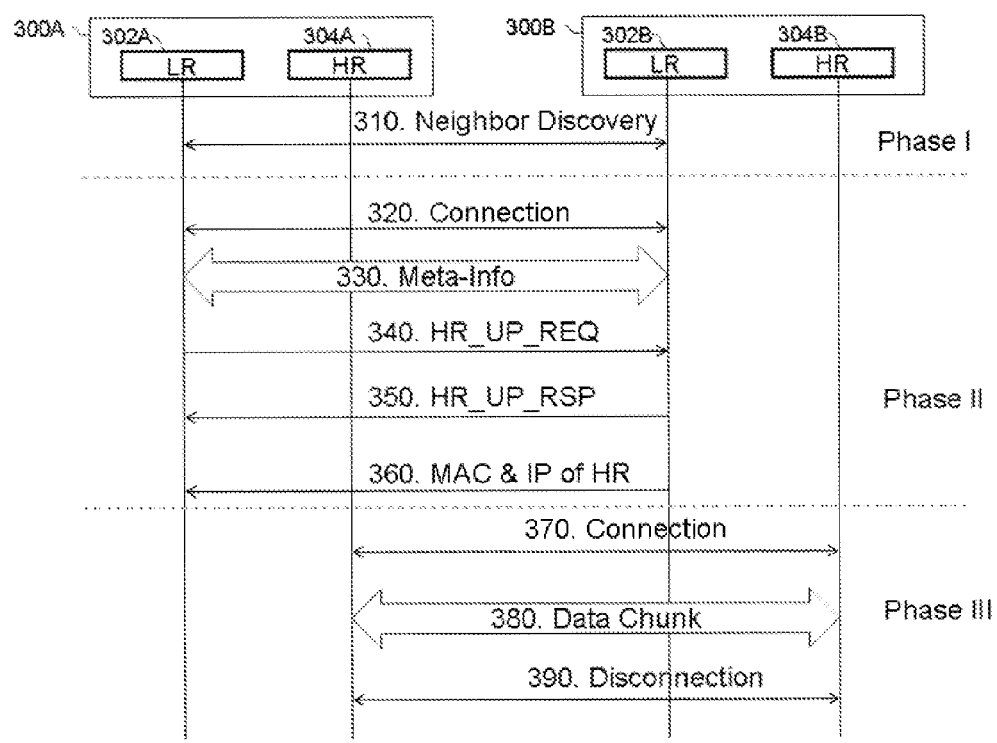
FIG. 3 illustrates a signal chat between two wireless devices for performing a wireless P2P communication application according to the exemplary embodiments of the present invention.

FIG. 3 illustrates a signal chat between a wireless device 300A and a wireless device 300B each of which is equipped with a LR interface (302A, 302B) and a HR interface (302A, 302B), for performing a wireless P2P communication according to embodiments of the present invention. Referring to FIG. 3, a wireless P2P communication application process can comprise three phases, including a phase for an automatic peer discovery (phase I), a phase for exchanging meta-information of a P2P communication application (phase II), and a phase for transferring data chunks of a P2P communication application (phase III).

In phase I, a wireless device 300A wanting a P2P communication application searches a wireless device 300B in its vicinity through a conventional P2P automatic neighbor discovery procedure in step 310. In an example embodiment where a wireless P2P communication network is constructed as a piconet as shown in FIG. 1, the automatic neighbor discovery can be implemented by standard BT LE piconet join or creation processes. A peer wireless device 300A can enter phase I whenever it is not associated with any wireless P2P communication network. For example, if a peer wireless device 300A cannot access any piconet as an advertiser, it can try to connect other peer wireless devices as a scanner or initiator. In embodiments of the present invention, during this phase, peer wireless devices adopt a LR interface for P2P communications, and the HR interface is switched off in order to save energy.

In phase I, some security mechanism can be implemented for the link layer connection between the LR interface 302A of the peer wireless device 300A and the LR interface 302B of the peer wireless device 300B, such as encryption and authentication. In phase I, peer wireless devices can employ device filtering mechanism, to restrict the devices from which it receives requests of the automatic peer discovery, such as advertising packets, scan requests or connection requests.

After the neighbor discovery procedure in phase I, a transport layer connection between the peer wireless device 300A and the peer wireless device 300B can be established through the LR interface in each peer wireless device (302A, 302B), in step 320. The meta-information of a P2P communication application can be exchanged over the connection through the LR interfaces in step 330. For example, the wireless device 300A can exchange meta-information for maintaining the transport layer connection between the peer wireless device 300A and the peer wireless device 300B.

If the wireless device 300A wants to share target data with the wireless device 300B, then the wireless device 300A can exchange meta-information regarding the target data with wireless device 300B. In an example embodiment, the wireless device 300A and wireless device 300B can action as a slave node in a piconet, and exchange meta-information via a master node. For example, wireless devices 300A and 300B can periodically updates the information regarding its currently owned target data to the master node, including file list, indexes of the data chunks of the target data and so on. Wireless devices 300A and 300B can also query the master node for finding target data it interests, so as to get the list of peer nodes that have the target data. In an example embodiment, when the wireless device 300A wants to obtain the target data from the wireless device 300B, the P2P communication application in the wireless device 300A will initiates a transport layer connection to the wireless device 300B, for transporting data chunks of the target data. In the conventional P2P communication, this transport layer connection for transporting data chunks will be established through the same radio interface as the transport layer connection for meta-information exchange.

In contrast, in embodiments of the present invention, the transport layer connection for transporting data chunks can be established through the different radio interface from the connection for meta-information exchange. When a connection request for transporting data chunks is detected, another radio interface different from the radio interface through which the transport layer connection for meta-information transmission of the P2P communication application is established, can be triggered to be turned on. For example, the HR interface will be turned on. Then, a new transport layer connection for the data chunk transmission can be established through the HR interfaces 304A and 304B.

In an example embodiment of the present invention, before the triggering to turn on the HR interface 304A, the wireless device 300A can query the availability of the corresponding radio interface 304B in the wireless device 300B. The wireless device 300A can notify the wireless device 300B that a corresponding radio interface is needed to turn on for establishing a link layer connection, for example, by sending a message HR_UP_REQ to the wireless device 300B in step 340. In response, the wireless device 300B can turn on its HR interface for transporting data chunks, and then notify the wireless device 300A that its HR interface is ready for establishing a link layer connection, by sending back a message HR_UP_RSP in step 350. Then, the wireless device 300A and 300B can also exchange media access address and network address (IP address) of their HR interfaces in step 360. Alternatively, the media access address and network address (IP address) of the HR interface of the wireless device 300A can be contained in the message HR_UP_REQ, and the media access address and network address (IP address) of the HR interface of the peer wireless device 300B can be contained in the message HR_UP_RSP. It should be noted that all these meta-information are exchanged between the wireless devices 300A and 300B through the LR interfaces 302A and 302B.

In another example embodiment, the wireless device 300A can notify at least one wireless device (including the wireless device 300B) in the list of peer nodes that have the target data to turn on a radio interface of the at least one wireless device for transporting data chunks. After receiving notification that the HR interface of one of the at least one wireless device (e.g. the wireless device 300B) is ready for establishing a link layer connection, the wireless device 300A can establish a transport layer connection with the one of the at least one peer wireless device by using the IP addresses of the HR interfaces of the wireless device 300A and the one of the at least one peer wireless device.

When the HR interfaces 304A and 304B are turned on and necessary information of the addresses of the HR interfaces 304A and 304B are known to both of the wireless device 300A and the wireless 300B, a new connection for transporting data chunks in the transport layer can established through the HR interfaces 304A and 304B, as shown in step 370. The addresses information can comprises the media access address and network address (IP address) of the HR interfaces 304A and 304B. Then the data chunks of a P2P application can be transported via this new connection through HR interfaces, as shown in step 380.

During the course of the data chunk transmission, the wireless device 300A can continue to exchange meta-information through the LR interface 302A with the wireless device 300B. For example, the wireless device 300A and 300B can update to the master node, the index of the data chunk according to the current transmission of the data chunk. In an example embodiment, when the transmission of the data chunks is finished, the wireless devices 300A or 300B can close the connection of data chunk transmission and close their HR interfaces 304A, 304B for energy saving.

Figure 4:
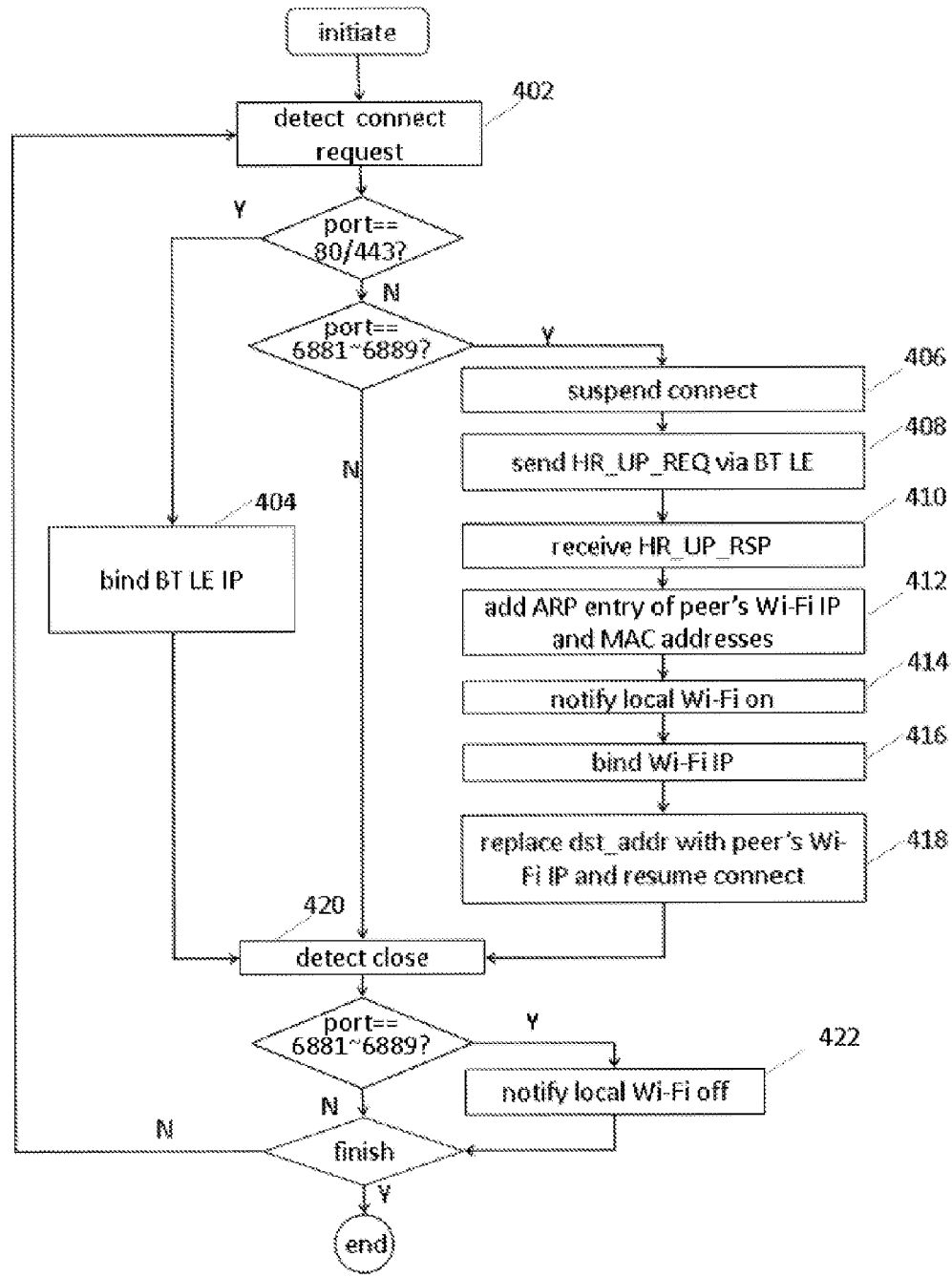
FIG. 4 is a flow chat illustrating the method operational in a wireless device equipped with two radio interfaces for performing a wireless P2P communication application according to the exemplary embodiments of the present invention.

FIG. 4 is a flow chat illustrating the method operational in a wireless device for controlling two radio interfaces for performing wireless P2P communication according to embodiments of the present invention. In this example embodiment, a BT LE radio interface will be used as one example of a radio interface which is capable to provide low energy consumption, but radio interface of other wireless communication technologies such as Zigbee radio interface are also possible. Furthermore, a Wi-Fi radio interface will be used as one example of a high-transfer-rate radio interface, but radio interface of other wireless communication, such as UWB radio interface are also possible. Although just two radio interfaces are comprised in a wireless device, it is to be appreciated that a wireless device can be equipped with more than two radio interfaces. According to an optional feature, two radio interfaces of the more than two radio interfaces can be selected for P2P communications according to their characters, such as energy consumption, data rate, interference between different radio interfaces, security, and/or the other like.

Referring to FIG. 4, a P2P communication application in a wireless device is initiated for providing an application through a P2P communication with a peer node. In a P2P communication application, data chunks can be distinguished from the meta-information, so that data chunks can be transported via a connection in the transport layer different from that of the meta-information. For example, according to the BitTorrent protocol, the meta-information can be sent and received via a HTTP/HTTPS GET method, which goes through 80/443 port, while data chunks can be sent and received through a port falling within the range 6881 to 6889. Then, a P2P application can initiate a transport layer connection for exchanging the meta-information to specific ports, e.g. 80 or 433 port according to the BitTorrent protocol. A P2P communication application can initiate a transport layer connection for transporting the data chunk to specific ports, e.g. a port falling within the range of 6881 to 6889 according to the BitTorrent protocol.

A connection request for transporting data chunks of a P2P communication application can be detected, by detecting the ports of all connection requests of the P2P communication application, (as shown in step 402). Taken a P2P application according to the BitTorrent protocol as an example, when a connection request whose port is 80 or 443 is detected, it can be determined that this is a connection for transporting the meta-information of a P2P communication application. Then, this connection request can be responded by establishing a connection through the BT LE radio interface. For example, this connection will be established in the transmission layer by binding (step 404) the socket with the IP address of the BT LE radio interface, so that the meta-information will be transferred merely via the LR interface.

In an example embodiment, when a connection request of a P2P communication application whose port falls within the range 6881 to 6889 is detected, it can be determined that this is a connection for transporting data chunks of the P2P communication application. Then a Wi-Fi radio interface will be triggered to turn on, so that a new connection in the transport layer can be established through the Wi-Fi radio interface. In an example embodiment, the conventional operation for establishing a connection in a transport layer can be suspended (step 406), and then the following actions can be performed.

A message (e.g. HR_UP_REQ) to at least one peer node can be send (step 408) via a LR interface, to notify the at least one peer node to turn on its Wi-Fi radio interface. The message can contain the MAC and IP addresses of the Wi-Fi radio interface of the wireless device. A message (e.g. HR_UP_RSP) can be received (step 410) from one of the at least one peer node, containing the MAC and IP addresses of the Wi-Fi radio interface of one of the at least one peer node. The received MAC and IP addresses of one of the at least one peer node can be stored in the wireless device (step 410) as a static ARP (address resolution protocol) mapping entry. After receiving the response, the Wi-Fi radio interface of the wireless device can be triggered to turn on.

It is to be appreciated that in a P2P application, a wireless device may establish transport layer connections with multiple peer nodes. Each time a connection request of data chunk transmission is detected, the radio control adaptor will trigger to turn the Wi-Fi radio interface. If the Wi-Fi radio interface has been turned on for data chunk transmission with the other peer nodes, the triggering notification can be ignored. Otherwise, the Wi-Fi radio interface can be turned on.

Then, a new connection for transporting data chunks can be established by using the MAC and IP addresses of the Wi-Fi interfaces of the wireless device and the peer node. For example, the socket of the new connection can be bond (step 416) with the IP address of the Wi-Fi radio interface of the wireless device, and the destination IP address in the socket can be replaced (step 418) with the IP address of the Wi-Fi radio interface of the peer node. Then, the suspended conventional operation for establishing a connection in the transport layer can be resumed to continue its the connection establishing process, for example comprising a TCP handshake procedure according to the BitTorrent protocol. Then, a new connection can be established through the Wi-Fi radio interface, for transporting the data chunk of the P2P communication application.

Referring to FIG. 4, the flow chat can further comprise detecting a disconnection request to close the connection of data chunk transmission. The disconnection request can be issued by the P2P communication application, for example when the data chunk transmission of a P2P application is completed. Similar as the detection of the connection request for data chunk transmission, the disconnection request can detected by detecting the ports of all disconnection requests of the P2P communication application. In an example embodiment, a disconnection request whose port falls within the range from 6881 to 6889 can be detected as the disconnection request for finishing the transmission of the data chunks. Then the Wi-Fi radio interface of the wireless device can be triggered (422) to turn off. Then, the process can proceed to step 402 for detecting further connection requests of the P2P communication application, if the transport layer connection is not finished.

Figure 5:
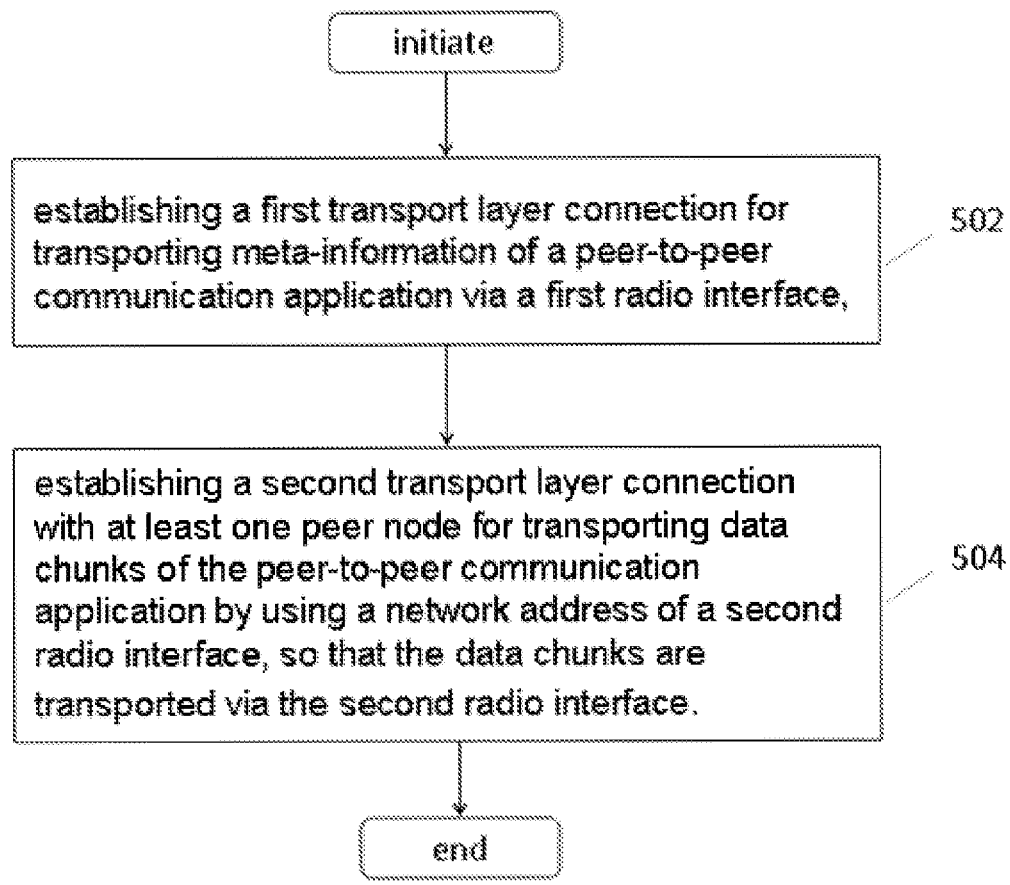
FIG. 5 is a flow chat illustrating the method operational in a wireless device for equipped with two radio interfaces, for performing a wireless P2P communication application according to the exemplary embodiments of the present invention.

FIG. 5 is a flowchart of a system, method and program product according to exemplary embodiments of the invention. It will be understood that each block or step of the flowcharts, and combinations of blocks in the flowcharts, may be implemented by various means, such as hardware, firmware, processor, circuitry and/or other devices associated with execution of software including one or more computer program instructions. For example, one or more of the procedures described above may be embodied by computer program instructions. In this regard, the computer program instructions which embody the procedures described above may be stored by a memory device of the mobile terminal and executed by a processor in the mobile terminal. As will be appreciated, any such computer program instructions may be loaded onto a computer or other programmable apparatus (e.g. hardware) to produce a machine, such that the resulting computer or other programmable apparatus embodies means for implementing the functions specified in the flowchart's block(s) or step(s). These computer program instructions may also be stored in a computer-readable memory that may direct a computer or other programmable apparatus to function in a particular manner, such that the instructions stored in the computer-readable memory produce an article of manufacture including instructions the execution of which implement the functions specified in the flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart's block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one embodiment of a method for performing a wireless P2P communication in a wireless device equipped with two radio interfaces, may comprises, establishing a first transport layer connection for transporting meta-information of the P2P communication application via a first radio interface, at operation 502; and establishing a second transport layer connection with at least one peer node for transporting data chunks of the P2P communication application by using a network address of the second radio interface at operation 504, so that the data chunks can be transported via the second radio interface.

In an exemplary embodiment, the method operational in a wireless device can further comprise detecting a connection request for transporting data chunks of the P2P communication application; triggering to turn on the second radio interface, in response to the detection of the connection request;

In an exemplary embodiment, the establishing of the second transport layer connection can further comprise sending via the first transport layer connection, a media access address and a network address of the second radio interface to the at least one peer node; and receiving via the first transport layer connection, a media access address and a network address of the corresponding radio interface of the at least one peer node for transporting data chunks.

In an exemplary embodiment, the method operational in a wireless device can further comprises detecting a disconnection request for finishing the transmission of the data chunks, and in response to the detection of the disconnection request, triggering to turn off the second radio interface. In an exemplary embodiment, the method operational in a wireless device can further comprises informing via the first transport layer connection, the at least one peer node of the P2P communication application to turn on a radio interface of the at least one peer node for transporting data chunks.

Figure 6:
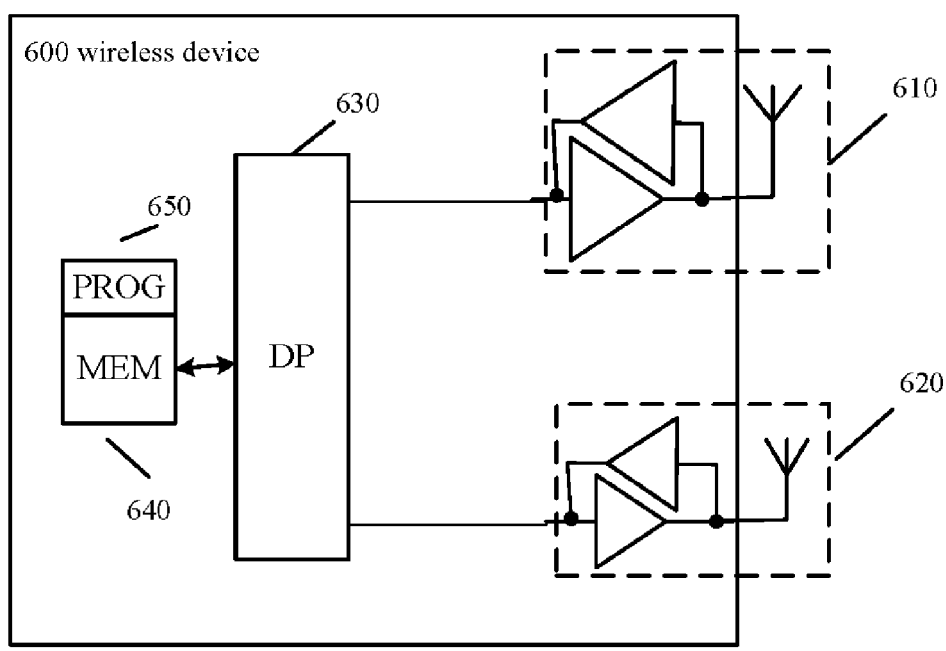
FIG. 6 illustrates a simplified block diagram of various wireless devices suitable for use in practicing the exemplary embodiments of the present invention.

Now reference is made to FIG. 6 illustrating a simplified block diagram showing the functional structure of a wireless device 600 suitable for use in practicing the exemplary embodiments of the present invention. In FIG. 6, a wireless device 600 can comprise a data processor (DP) 630, a memory (MEM) 640 that stores a program (PROG) 650, and two radio interfaces 610 and 620, each of which can comprise a transceiver and an antenna, for communicating over a wireless P2P network.

At least one of the PROG 650 is assumed to include program instructions that, when executed by the associated DP 630, enable the wireless device to operate in accordance with the exemplary embodiments of this invention, as discussed above. That is, the exemplary embodiments of this invention may be implemented at least in part by computer software executable by the DP 630 of the wireless device, or by hardware, or by a combination of software and hardware. The basic structure and P2P communication operation of a wireless device are known to one skilled in the art.

The MEM 640 may be of any type suitable to the local technical environment and may be implemented using any suitable data storage technology, such as semiconductor based memory devices, flash memory, magnetic memory devices and systems, optical memory devices and systems, fixed memory and removable memory. The DP 630 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. A method comprising:
   establishing, by a wireless device including a first radio interface and a second radio interface, a first transport layer connection for transporting, via the first radio interface, meta-information of a peer-to-peer communication application, the first radio interface comprising a low energy radio interface;
   receiving, by the wireless device and via the first radio interface including the first transport layer, meta-information, the meta-information comprising peer discovery information;
   detecting a connection request for transporting at least one data chunk of the peer-to-peer communication application, the connection request for transporting the at least one data chunk detected based on a port number associated with a predetermined range of port numbers;
   triggering, in response to the detected connection request, the establishment of the second radio interface; and
   establishing, by the wireless device and based on the received meta-information received via the first radio interface, a second transport layer connection with at least one peer node for transporting at least one data chunk of the peer-to-peer communication application via at least the second radio interface comprising a high energy radio interface utilizing more energy when compared to the low energy radio interface.

2. The method of claim 1, wherein
   the connection request is received via the first radio interface.

3. The method of claim 2, wherein the connection request is detected by detecting ports of all connection requests of the peer-to-peer communication application.

4. The method of claim 3, wherein the predetermined range is from about 6881 to 6889.

5. The method of claim 1, further comprising:
   detecting a disconnection request for finishing the transmission of the at least one data chunk, the disconnection request received via the first radio interface, and in response to the detection of the disconnection request, triggering to turn off the second radio interface.

6. The method of claim 5, wherein the disconnection request is detected by detecting ports of all disconnection requests of the peer-to-peer communication application.

7. The method of claim 6, wherein the disconnection request whose port numbers falls within the range from about 6881 to 6889 is detected as the disconnection request for finishing the transmission of the at least one data chunk.

8. The method of claim 1, further comprising:
   informing via the first radio interface including the first transport layer connection, the at least one peer node to turn on a radio interface of the at least one peer node for transporting the at least one data chunk; and
   receiving a notification from the at least one peer node, via the first radio interface including the first transport layer connection, to turn on the second radio interface for transporting the at least one data chunk.

9. The method of claim 1, wherein the establishing the second transport layer connection comprises:
   sending via the first transport layer connection, a media access address and a network address of the second radio interface to the at least one peer node; and
   receiving via the first transport layer connection, a media access address and a network address of the radio interface of the at least one peer node for transporting the at least one data chunk.

10. The method of claim 1, wherein the meta-information comprises extra data for transporting the at least one data chunk.

11. The method of claim 1, wherein the first radio interface is a Bluetooth Low Energy radio interface or a Zigbee radio interface, and the second radio interface is a Wi-Fi radio interface or an ultra wideband radio interface.

12. An apparatus comprising:
at least one processor; and
at least one memory including computer program code,
the at least one memory and the computer program code configured to, with the at least one processor, cause the apparatus to at least:
  establish, by the apparatus including a first radio interface and a second radio interface, a first transport layer connection for transporting, via the first radio interface, meta-information of a peer-to-peer communication application, the first radio interface comprising a low energy radio interface;
  receive, by the apparatus and via the first radio interface including the first transport layer, meta-information, the meta-information comprising peer discovery information;
  detect a connection request for transporting at least one data chunk of the peer-to-peer communication application, the connection request for transporting the at least one data chunk detected based on a port number associated with a predetermined range of port numbers;
  trigger, in response to the detected connection request, the establishment of the second radio interface; and
  establish, by the apparatus and based on the received meta-information received via the first radio interface, a second transport layer connection with at least one peer node for transporting at least one data chunk of the peer-to-peer communication application via at least the second radio interface comprising a high energy radio interface utilizing more energy when compared to the low energy radio interface.

13. The apparatus of claim 12, wherein
the connection request is received via the first radio interface.

14. The apparatus of claim 13, wherein the connection request is detected by detection of the ports of all connection requests of the peer-to-peer communication application.

15. The apparatus of claim 12, wherein apparatus to apparatus is further configured to at least:
  detect a disconnection request for finishing the transmission of the at least one data chunk, the disconnection request received via the first radio interface, and in response to the detection of the disconnection request, triggering to turn off the second radio interface.

16. The apparatus of claim 12, wherein apparatus is further configured to at least:
  inform via the first radio interface including the first transport layer connection, the at least one peer node to turn on a radio interface of the at least one peer node for transporting at least one data chunk.

17. The apparatus of claim 12, wherein the apparatus is further configured to at least:
  receive a notification from at least one peer node, via the first radio interface including the first transport layer connection, to turn on the second radio interface for transporting at least one data chunk.

18. The apparatus of claim 12, wherein the apparatus is further configured to at least:
  send via the first transport layer connection, a media access address and a network address of the second radio interface to the at least one peer node; and
  receive via the first transport layer connection, a media access address and a network address of the radio interface of the at least one peer node for transporting at least one data chunk.

19. A non-transitory computer program product comprising at least one computer-readable medium bearing computer program code embodied therein with the computer program code including program code configured to at least:
  establish, by a wireless device including a first radio interface and a second radio interface, a first transport layer connection for transporting, via the first radio interface, meta-information of a peer-to-peer communication application, the first radio interface comprising a low energy radio interface;
  receive, by the wireless device and via the first radio interface including the first transport layer, meta-information, the meta-information comprising peer discovery information;
  detect a connection request for transporting at least one data chunk of the peer-to-peer communication application, the connection request for transporting the at least one data chunk detected based on a port number associated with a predetermined range of port numbers;
  trigger, in response to the detected connection request, the establishment of the second radio interface; and
  establish, by the apparatus and based on the received meta-information received via the first radio interface, a second transport layer connection with at least one peer node for transporting at least one data chunk of the peer-to-peer communication application via at least the second radio interface comprising a high energy radio interface utilizing more energy when compared to the low energy radio interface.

* * * * *